United States Patent Office.

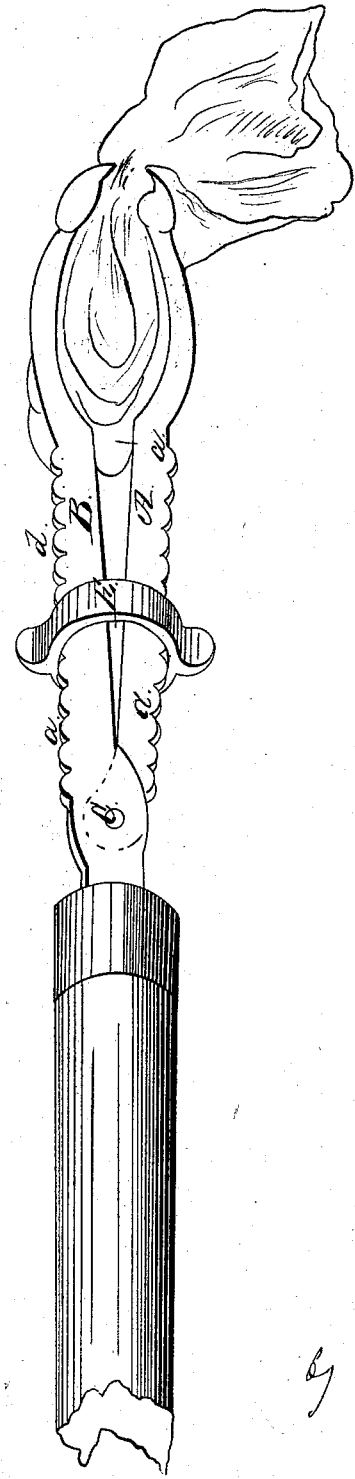

H. M. GUILD, OF SPRINGFIELD, MASSACHUSETTS.

Letters Patent No. 67,873, dated August 20, 1867.

---

IMPROVED MOP-HEAD.

---

The Schedule referred to in these Letters Patent and making part of the same.

---

TO ALL WHOM IT MAY CONCERN:

Be it known that I, H. M. GUILD, of Springfield, Hampden county, Commonwealth of Massachusetts, have invented certain new and useful improvements in "Mop-Heads;" and I do hereby declare that the following is a full and exact description thereof, reference being had to the accompanying drawings and to the letters of reference marked thereon.

In the drawings, the figure represents a perspective view of my improved mop-head in use.

My improvements relate particularly to the mop-head patented by Louis C. Rodier. In Rodier's patent the jaws were hinged together near the middle of their shanks, and the end of one of these shanks was attached to the handle, leaving the end of the other shank to be used as a lever. A ring was slipped over the end of this lever, encircling both it and the fixed shank, so that when the grip was taken by the jaws, it was held there by the ring, notches being cut into the edges of the shanks to prevent the ring from slipping.

In my invention, I hinge the jaw A, at its end, into the shank of the jaw B, at C. The backs of these shanks are cut in threads $a\ a\ a$, forming segments of a continuous spiral. Over both of these, working on the threads $a\ a\ a$, I place a nut, E, having the ears $b\ b$ so that it can be turned by hand. This nut has threads cut inside, which correspond with those on the jaws. By turning this nut in either direction it advances or recedes along the threads, tightening or loosening the grip of the jaws.

The operation of this device is more perfect than the one before described, as, instead of being obliged to obtain the pressure of the jaws upon the cloth by hand, and then to secure it, I obtain the power of the screw to get the pressure, securing it at the same time at its highest degree, and, besides this, the jaws are more adjustable to different sizes of mops.

I hereby disclaim so much of the within-described device as is shown and described in the said patent granted to Louis C. Rodier for a mop-head, but claim the peculiar arrangement of the parts described as an improvement upon said patent.

Now, having described my invention, what I claim as new, and desire to secure by Letters Patent, is—

The arrangement of the jaws A B, hinged at C, and having the threads $a\ a$, &c., of the screw cut thereon, in combination with the nut E, arranged so as to fit said screw-threads $a\ a$, and to bring together the jaws A B, by turning the same towards the end holding the mop, substantially as shown and described.

H. M. GUILD.

Witnesses:
JOHN M. STEBBINS,
EDWARD H. HYDE.